Nov. 29, 1955 E. G. MILLER 2,725,201
BRAKING MEANS FOR THE SPOOL OF A FISHING REEL
Filed April 17, 1953 2 Sheets-Sheet 1

INVENTOR.
Edward G. Miller

Nov. 29, 1955  E. G. MILLER  2,725,201
BRAKING MEANS FOR THE SPOOL OF A FISHING REEL
Filed April 17, 1953  2 Sheets-Sheet 2

INVENTOR.
Edward G. Miller

United States Patent Office 2,725,201
Patented Nov. 29, 1955

2,725,201

BRAKING MEANS FOR THE SPOOL OF A FISHING REEL

Edward G. Miller, Cleveland, Ohio; Johanna A. Miller, administratrix of the estate of said Edward G. Miller, deceased, assignor to Johanna A. Miller, individually Application April 17, 1953, Serial No. 349,377

5 Claims. (Cl. 242—84.5)

This invention relates to a new improved and useful device for use as a braking means for the spool of a fishing reel, when the latter is mounted on a fishing or casting rod. The braking means are adapted to be removably mounted on the reel and manually operated for controlling, at will, the unreeling of the fishing line therefrom.

One of the objects of this invention is to provide a device in the form of a brake adapted for use on new or used reels that can be operated by either hand of a person when in the act of casting a fishing line.

Another object of the invention is to provide an improved brake device operable by pressure on both sides of the spool of a fishing reel and without any interference with the "running" of the line.

Another object of the invention is to provide an improved brake for a spool of a fishing reel adapted to be trunnioned on a cross member of a reel, whereby by movement of the thumb on the hand of the fisherman forwardly and rearwardly of the trunnions, the brake may be readily controlled to prevent any snarling or "backlash" in the fishing line.

Another object of the invention is to provide an improved brake device adapted to be operated as "a drag" as well as a brake by means of the exerting of sufficient thumb pressure on such device so as to provide the desired "drag" on the fishing line.

A further object of the invention is to provide an improved brake device trunnioned on a cross member of a reel and readily operable to alternately apply and release pressure on the reel spool, whereby during landing of a fish, after the latter strikes, "playing" of the fish may be carried out in a well known manner.

Another object of the invention is to provide an improved braking device having replaceable, separate alined braking elements adapted to engage the annular end walls of a fishing reel spool and means for adjustably securing the braking elements in braking relation to the annular end walls.

A still further object of the invention is to provide an improved brake device for the spool of a fishing reel of simplified construction adapted for quick attachment on and detachment from reels in conventional use without interfering in any manner with the free operation of the latter while capable of controlling the casting distance of a fishing line and/or pay-out of the line in landing a fish.

Other objects not recited herein and which are attainable by said device will be readily ascertained from the following description herein and a reference to the accompanying drawings, wherein.

Figure 1:
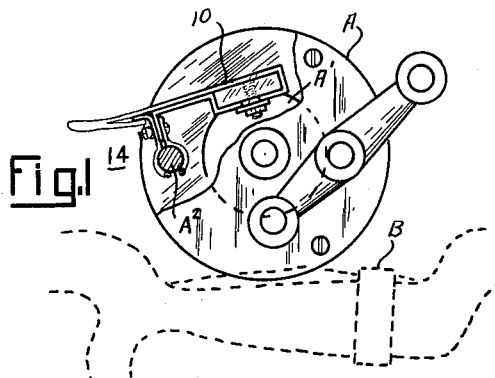
Figure 1 is a view in elevation of the outline of a conventional reel mounted on the handle portion of a fishing or casting rod and showing a braking means embodying the invention attached in operating position on the reel.

Describing the drawings more in detail:

In the drawings, A indicates a conventional fishing reel and B refers to the handle portion of such fishing or casting rod, as shown in dotted lines in Fig. 1. The reel spool is shown at A′ and the annular end walls or collars thereof are shown at A″. 10 indicates as an entirety the braking attachment shown in Figure 1 in its attached position on the reel. 11 indicates a base plate having a width less than the spacing of the collars A″, as will later be apparent. The bearing portion 11x is extended endwise of the plate 11 and folded back on itself, as shown at 11A, for a purpose later set forth. The upper end of the plate 11 is extended and bent laterally inwardly to provide an end wall 11B, the latter wall being extended and bent downwardly at a right angle thereto to provide a rear wall 11′ parallel to the plate 11. The plate 11, intermediate the bearing portion 11x and its upper end, is formed with openings 11C, 11d, later referred to. 13 indicates a supporting member consisting of a main section 13′ suitably secured to the rear or inner face of the plate 11, preferably by rivets 21, extending through the apertures 13C registering with the pair of apertures 11d. The lower end of the member 13 is extended and bent laterally to provide a base 13b, to which reference is later set forth. The upper end of the member 13 is provided with an angular offset section 13x having a transverse wall 13A disposed parallel to the plate 11 and alined with the rear wall 11′. 14 indicates as an entirety means for mounting the braking attachment on the reel A and consisting of upper and lower supports 14a, 14a′, preferably formed of sheet metal and at least one thereof being resilient. The supports 14a, 14a′, preferably have a width substantially equal to that of the plate 11 and supporting member 13 and extend laterally inwardly at substantially right angles to the latter. The outer ends of the supports 14a, 14a′, terminate in opposed, reversely related arcuate walls 14b, the inner walls of which are rotatively mounted on the cross bar A² of the reel A.

As the supports 14a, 14a′, are disposed between the opposite ends of the base plate 11, the cross bar A² provides a trunnion about which the device 10 may be rocked to apply on or release braking pressure from the spool end walls A″. As later set forth, the walls engage the bar A² under pressure.

Figure 3:
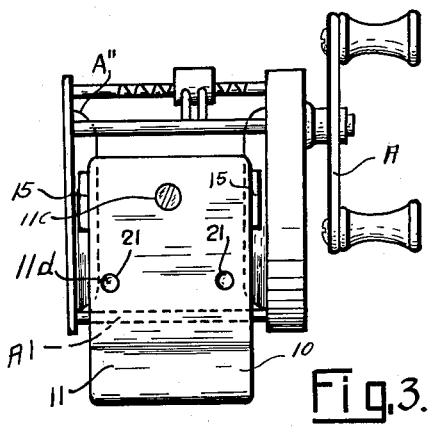
Fig. 3 is a plan view.
Figure 2:
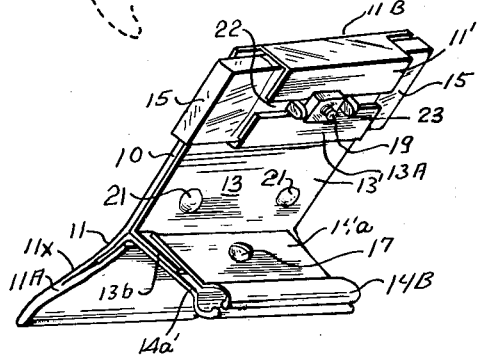
Figure 2 is a bottom view in perspective of the device in a vertical or upright position.
Figure 4:
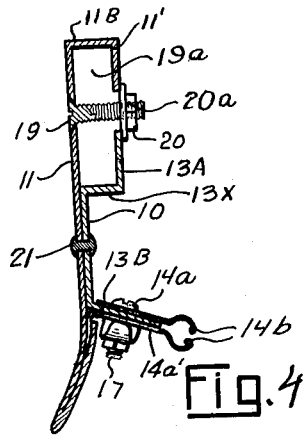
Fig. 4 is a sectional view of my present device.
Figure 5:
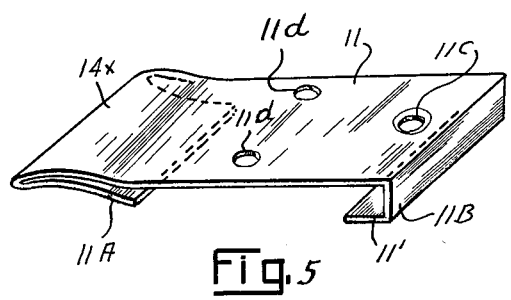
Figure 5 is a horizontal view of the base plate with its top surface uppermost.
Figure 6:
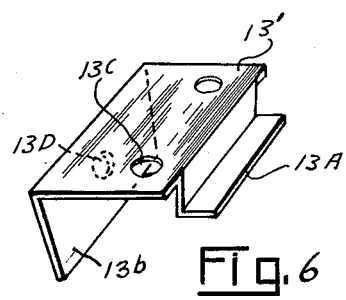
Figs. 6, 7 and 8 are views of the non-integral parts that make up the complete device with the base plate shown in Figure 5.
Figure 7:
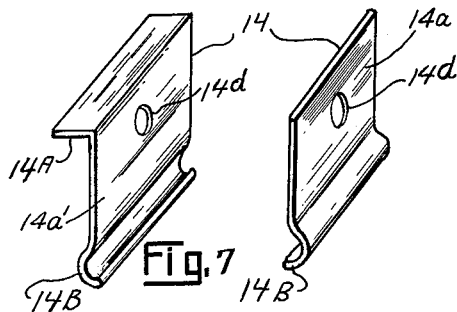
Figure 9:
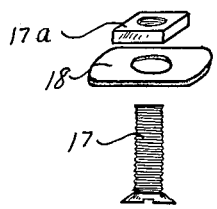
Figures 9 and 10 show means for attaching the non-integral parts shown in Figs. 6, 7 and 8 to the base plate shown in Figure 5.
Figure 10:
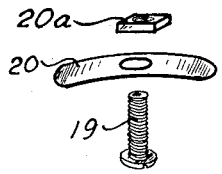

As shown in Figs. 1, 2 and 3, the outer ends of the walls 14b are normally disposed in spaced relation and slightly rolled or deformed inwardly, as shown at 14b′, to facilitate engagement of the walls 14b with the bar A². Accordingly, the device 10 may be positioned on the bar A² by a thrust inward movement at right angles to the latter, whereby the end walls 14b will ride the bar A² and engage the latter as shown in Fig. 1. The inner end of the support 14a′ is provided with a flange 14c which is mounted between the plate 11 and folded portion 11A. The inner portion of the support 14a extends over the wall 13b and is secured thereto in any desired manner. The securing means shown consist of a screw 17 extending through registering openings 14c′, 13D, 14d, formed in the upper support 14a, wall 13b and support 14a′, respectively, a washer 18 (see Fig. 9) and a nut 17a, threaded on the screw, for rigidly securing the supports 14a, 14a′, to the wall 13b.

Figure 8:
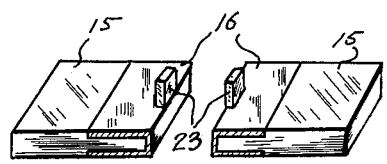

As shown in Figs. 1, 2 and 3, the walls 11B, 11′, 13x, 13A and the adjacent portion of the plate 11 cooperate to provide a housing 19a in which the inner portions of suitable braking elements (each indicated at 15) are adjustably and removably mounted. The opposite outer portions of the braking elements 15 extend laterally beyond the outer ends of the housing 19a and are adapted to engage the spool collars A'' when the device 10 is rocked clockwise, as viewed in Fig. 1. Each of the braking elements 15 may consist of a pad 15a of suitable yieldable material (such as fiber, rubber and the like). By preference, the inner portions of the pads 15a are mounted in U-shaped holders 16, as shown in Fig. 8. The braking elements 15 are secured in the housing 19a by a screw 19 which extends through the opening 11c, the space between the inner ends of the braking elements, the space 22 between the alined walls 11', 13A and through a bridge member 20 (arranged to span the space between the walls 11', 13A, and engages the latter) for engagement with a nut 20a, which, when tightened, operates through the bridge member 20 to flex the walls 11', 13A, inwardly and thereby clamp the braking elements 15 between the latter and the plate 11. The holders 16, adjacent their inner ends and midway their opposite sides, are provided with outwardly extending lugs 23. The lugs 23 serve as suitable means for moving the braking elements 15 into the housing 19a, adjusting them endwise when wear results on the braking material and for removing the elements 15 when replacements thereof are found desirable. The braking pads 15 are adjustable so as to span the distance between the sides of the spool, such distance varying with the size of the latter. This adjustment is provided by the bolt 19 and associated parts as follows: By loosening the tension exerted by the bolt 19 on the plate 20, which releases the tension on the walls 11', 13A, the braking elements 15 may be moved toward or away from each other as required so that the fiber portions of the elements will at all times be in position to contact with and bear against the end walls or collars A² of the spool, and the bolt 19 being then tightened, such parts will be securely held in such adjusted position by means of the pressure thereon by the plate 20.

It will now be observed from the preceding description that the mechanism 10 may be readily positioned on the reel A by snapping the curled end portions of the elements 14a, 14a', on a cross bar of reel housing. The mechanism 10 will then be in the position on the reel as shown in Figs. 1 and 3 and by employing the thumb of the hand, which is holding the rod B, to apply pressure on the base plate 11 above the supports 14a, 14a', to rock the device clockwise (as viewed in Fig. 1), the braking elements will contact the end walls of the spool under pressure and apply braking power in proportion to the amount of such pressure applied. By shifting the thumb to that portion of the base plate 11 below the supports 14a, 14a', and applying pressure thereto the device will be rocked in the opposite direction to disengage the braking elements from the end walls or collars A². As those portions of the base plate with which the thumb engages are contiguously related, very slight movement of the thumb from one portion to the other portion relative to the supports 14a, 14a', is required to apply or release the braking effect on the spool. Accordingly, the operations of alternately applying and releasing brake pressure on the spool may rapidly be effected. The attachment of the device to a reel and the operation thereof will not in any manner interfere with the reeling or unreeling of the fishing line nor contact therewith; neither will the wetting of such line affect the operation of the device.

It will be further observed that I have invented a new and most useful, as well as much needed, device for use in the art as specified; however, I wish it to be understood that while I have shown and described my invention in a desired structure and design, minor changes may be made therein without departing from the spirit of the invention, or the scope of the appended claims.

What I claim is:

1. A braking device for the spool of a fishing reel, comprising an elongated flat base plate the upper end of which is extended and shaped to provide a laterally disposed wall and a rear wall spaced from and parallel to said base plate, a second plate, means for securing the mid-portion of said second plate to the inner face of said base plate intermediate the opposite ends of the latter, the upper end of said second plate being extended and shaped to provide a laterally disposed wall and a rear wall spaced from and parallel to said base plate and in alinement with said first mentioned rear wall and its lower end being extended and bent laterally to provide a support disposed inwardly of the lower end of said base plate, braking material mounted within and between said rear walls and said base plate and extending outwardly from one side of said walls and adapted to engage the annular end wall of the reel spool, and upper and lower clamping members fixedly mounted on said support and extending outwardly therefrom, the outer end portions of said clamping members being arranged to removably and rotatively engage a cross member on the fishing reel, whereby said base plate may be rocked on the reel cross member to move said braking material into and out of engagement with the annular end wall of the reel spool.

2. A device as claimed in claim 1 wherein one of said clamping members is formed of resilient metal.

3. A device as claimed in claim 1 wherein the outer end portions of said clamping members consist of spaced arcuate walls to permit snap-on and snap-off thereof relative to the reel cross member.

4. A device as claimed in claim 1 wherein said braking material consists of separate sections the outer end portions of which are adapted to engage the annular end walls of the reel spool and means engaging said base plate and said rear walls are provided for adjustably securing said sections to said base plate and walls.

5. A braking device for the spool of a fishing reel comprising an elongated base plate, a second plate the lower portion of which is secured to the inner face of said base plate between its opposite ends, the upper end portion of said second plate being offset to provide a wall spaced from and parallel to said base plate, braking material mounted between said wall and said base plate and extending laterally at one side of said wall for engagement with the adjacent annular end wall of the reel spool, means for adjustably securing the braking material to said wall and base plate, the lower end of said second plate being bent laterally outwardly to provide a support inwardly of the lower end of said base plate, and upper and lower clamping members fixedly mounted on said support and extending outwardly therefrom, the outer end portions of said clamping members being shaped to rotatively engage a cross bar on the reel to trunnionly support the base plate on the bar.

References Cited in the file of this patent

UNITED STATES PATENTS

| | | |
|---|---|---|
| 1,379,692 | Pflueger | May 31, 1921 |
| 2,527,131 | Honeycutt, Sr. | Oct. 24, 1950 |